United States Patent [19]
Isobe et al.

[11] Patent Number: 5,137,944
[45] Date of Patent: Aug. 11, 1992

[54] TWO LIQUIDS NON-MIXED TYPE-ACRYLIC ADHESIVE COMPOSITION

[75] Inventors: Kanji Isobe; Kazutami Wakabayashi, both of Kawaguchi, Japan

[73] Assignee: Nogawa Chemical Co., Ltd., Tokyo, Japan

[21] Appl. No.: 319,287

[22] Filed: Mar. 6, 1989

[30] Foreign Application Priority Data

Dec. 23, 1988 [JP] Japan .................. 63-325099

[51] Int. Cl.$^5$ .......................... C08L 63/10
[52] U.S. Cl. .................. 523/423; 524/906; 525/116
[58] Field of Search .............. 427/208.8, 208.4, 333, 427/340, 302; 523/423; 525/404, 406, 65, 116; 524/906

[56] References Cited

U.S. PATENT DOCUMENTS

| | | | |
|---|---|---|---|
| 3,890,407 | 6/1975 | Briggs, Jr. et al. | 525/164 |
| 4,032,479 | 6/1977 | Bunnomori et al. | 525/404 |
| 4,135,033 | 1/1979 | Lawton | 427/333 |
| 4,170,612 | 10/1979 | Pastor et al. | 427/302 |
| 4,308,185 | 12/1981 | Evans et al. | 525/63 |
| 4,645,801 | 2/1987 | Bamhouse | 525/404 |
| 5,059,656 | 10/1991 | Tsuji | 524/906 |

FOREIGN PATENT DOCUMENTS

61-51072  3/1986  Japan .
63-27387  6/1988  Japan .

Primary Examiner—Veronica P. Hoke
Attorney, Agent, or Firm—Fleit, Jacobson, Cohn, Price, Holman & Stern

[57] ABSTRACT

The following A-agent and B-agent are applied independently respectively to the faces of two materials to be attached and the faces of adhesion are stuck together.

| A-agent | |
|---|---|
| (1) chlorosulfonated polyethylene | 5-30 parts by weight |
| (2) one kind or more acrylic monomer which are selected from acrylic acid, methacrylic acid, acrylic ester, methacrylic ester, diacrylate, dimethacrylate, polyfunctional acrylate and polyfunctional dimethacrylate | 10-100 parts by weight |
| (3) diglycidyl ether type-epoxy resin | 0-50 parts by weight |
| (4) peroxide of cumene hydroperoxide and the like | 1-50 parts by weight |
| (5) age resister | 0-50 parts by weight |

The A-agent is obtained by mixing, stirring and solving above-mentioned (1), (2), (3), (4) and (5).

| B-agent | |
|---|---|
| (1) graft polymer composed epichlorohydrin rubber and acrylic monomer | 1-40 parts by weight |
| (2) polymerization promoter comprised of amnine-aldehyde condensation product | 1-50 parts by weight |
| (3) one kind or more acrylic monomer which are selected from acrylic acid, methacrylic acid, acrylic ester, methacrylic ster, diacrylate and dimethacrylate, polyfunctional acrylate and polyfunctional methacrylate | 10-130 parts by weight |
| (4) epoxy resin which is represented by diglycidyl ether type | 0-50 parts by weight |
| (5) age resister | 0-5 parts by weight |

The B-agent is obtained by mixing, stirring and solving the above-mentioned (1), (2), (3), (4) and (5).

Effects of the invention are 1) The working property become satisfactory, 2) An excessive permeation of the amine-aldehyde condensation product disappeared, 3) A stickiness of the overflowing portion is dissolved, and 4) A filling up—adhesive property is improved.

1 Claim, No Drawings # TWO LIQUIDS NON-MIXED TYPE-ACRYLIC ADHESIVE COMPOSITION

DETAILED EXPLANATION OF THE INVENTION

1. Industrial Utilization Field of the Invention

The two liquids non-mixed type-acrylic adhesive composition of the present invention is an adhesive which the utilization is expected to be widely used as an adhesion of various materials or on a field of the consuming public in the industrial world of light electric appliances, construction, motorcars, and the like.

2. Prior Art

An adhesive having a cure completing type (hereinafter, referred to as a primer type) by combining A-agent indicated in the claim with amine-aldehyde condensation product is an existing technique, and is in place on the market already (for example, Diabond SG-11, manufactured by Nogawa Chemical Co., Ltd.).

A curing mechanism of this adhesive is that a peroxide included in the A-agent is decomposed by amine-aldehyde condensation product of the primer and the acrylic monomer in the A-agent is polymerized and cured in accordance with the claim transfer of the radical which is generated. Also, by using amine-aldehyde condensation product for the reactive initiation catalyst, since the cure of A-agent is performed positively in the case which the peroxide is not existence in the A-agent, it is recognized that a graft polymerization is performed by the acrylic monomer to chlorosulfonated polyethylene in the A-agent.

However, the following defects are in existence in the customary technique (primer type).

(1) Working property is unsatisfactory.

When the viscosity of amine-aldehyde condensation product and the viscosity of A-agent are too much different, a treatment is difficult and the working property is unsatisfactory. (A-agent: 8000-13,000 cps, B-agent (primer) : below two hundred cps)

(2) An excessive permeation of amine-aldehyde condensation product.

In the case where amine-aldehyde condensation product is applied to a material having a porous surface and large permeability, an inferiority of contact is generated between A-agent and amine-aldehyde condensation product because of an excessive permeation due to the low viscosity and an unsatisfactory cure is produced.

(3) A survival of stickiness in an overflowed portion.

Amine-aldehyde condensation product is not concerned in the chemical reaction directory, and in the case where the condensation product is applied excessively in order that the condensation product may be a catalyst and an accelerator, the overflowed portion becomes sticky permanently.

(4) There is weakness in regard to the surface clearances.

In the case where the material to be attached is not a flat surface, an unsatisfactory cure on the basis of an inferior contact between A-agent and amine-aldehyde condensation product is produced due to the clearance of the adhesive surface.

Problems to be Solved by the Invention

The development of a two liquids non-mixed type-acrylic adhesive composition by which the above-mentioned defects are overcome. That is to say, the following problems are solved by the improvements are regarded as the problems.

(1) An improvement of working property.

(2) a prevention of an excessive permeation of amine-aldehyde condensation product.

(3) a dissolution of stickiness in the overflowed portion.

(4) an improvement of weakness in high surface clearances.

Means for Solving the Problems

Some high molecular substances were considered as a binder of amine-aldehyde condensation product in order to overcome these defects, it was considered that the effectiveness was satisfactory in overcoming the above-mentioned defects and then an examination was applied in regard to the affect of the adhesive toward natural rubber and synthetic rubber or synthetic resin on the market.

The conditions that are requested for the high molecular substances which are used as the binder of amine-aldehyde condensation product used for B-agent:

(1) Compatibility is satisfactory between the high molecular substances and acrylic polymer and chlorosulfonated polyethylene which are regarded as the fundamental composition of A-agent.

(2) The high molecilar substances are excellent for preservation stability and layer seperation stability in the case where are compounded in the B-agent.

It is discovered that the graft polymer composed of epichlorohydrin rubber and acrylic monomer indicated in the B-agent included in the claim by way of the high molecular substances which these conditions are satisfied is most effective. (Example No. 1 and Example No. 2)

The composition of A-agent in accordance with the present invention:

| A-agent | | |
|---|---|---|
| (1) Chlorosulfonated polyethylene | 5-30 parts by weight |
| (2) one or more acrylic monomers which are selected from acrylic acid, methacrylic acid, acrylic ester, methacrylic ester, diacrylate, dimethacrylate, polyfuctional acrylate and polyfunctional dimethacrylate | 10-100 parts by weight |
| (3) diglycidyl ether epoxy resin | 0-50 parts by weight |
| (4) peroxide of cumene hydroxide | 1-50 parts by weight |
| (5) age registor | 0-50 parts by weight |

The A-agent is obtained by mixing and stirring the above-mentioned (1), (2), (3), (4) and (5).

For the composition of B-agent:

| B-agent | |
|---|---|
| (1) graft polymer composed of epichlorohydrin rubber and acrylic monomer | 1–40 parts by weight |
| (2) polymerization promoter comprises condensation product | 1–50 parts by weight |
| (3) one or more acrylic monomers which are selected from acrylic acid, methacrylic acid, acrylic ester, methacrylic ester, diacrylate and dimethacrylate, polyfunctional acrylate and polyfunctional methacrylate | 10–100 parts by weight |
| (4) diglycidyl ether epoxy resin | 0–50 parts by weight |
| (5) age resister | 0–5 parts by weight |

The B-agent is obtained by mixing and stirring the above-mentioned (1), (2), (3), (4) and (5).

Function

The function of A-agent is well understood by referring to the specification of the Japanese Patent No. 1481258 (Japanese Patent Publication No. 27387 of 1988, Applicant: Nogawa Chemical Co., Ltd.) and the above-mentioned function is not included herein as it is well-known.

A detailed description follows with respect to the function of the B-agent. The role of the graft polymer composed of epichlorohydrin rubber and acrylic monomer in the B-agent depends upon the fact that the viscosity of B-liquid can be adjusted freely by regulating compounding quantity in company with a fact that it is a binder of amine-aldehyde condensation product. (so-called two liquids both main agent type). Also, a mutual solubility is in existence between chlorosulfonated polyethylene and acrylic polymer in the A-agent and B-agent, and after the cure, the powerful adhesive layer is formed.

A comparatively satisfactory result is also obtained in the simple substance of epichlorohydrin rubber from among the high molecular substances which are examined, and this result is already described in the specification of the Japanese Patent No. 1481258 (Japanese Patent Publication No. 27387 of 1988.

The conditions which are required with regard to the high molecular substances used as the binder are:

(1) Compatibility between the high molecular substances and chlorosulfonated polyethylene and acrylic polymer which are regarded as a fundamental composition of A-agent is satisfactory.

(2) The preservation stability and the layer separation stability are excellent in the case where the high molecular substances are compounded in the B-agent.

The above-mentioned conditions are not satisfied sufficiently in the simple substance of epichlorohydrin rubber.

Particularly, with regard to the preservation stability of the condition (2), it cannot be said that the simple substance of epichlorohydrin rubber is an excellent binder in order to satisfy the preservation stability for the period of 1–2 years, required for the usefulness of the consuming public and the common industrial usefulness.

Acrylic acid, methacrylic acid, acrylate ester, methacrylate ester, diacrylate, dimethacrylate, polyfunctional acrylate and polyfunctional methacrylate are called the reactive acrylic monomer, and the above-mentioned acrylic monomers are polymerized and cured by catalytic action of the peroxide which is compounded in the A-agent. The mixed system is produced by blending the graft polymer composed of the above-mentioned chlorosulfonated polyethylene and epichlorohydrin rubber and acrylic monomer, the above reactive acrylic monomer, and then a polymerization process itself results in an adhesive process accompanied with which a reinforcement effect of elastomer layer occur.

The epoxy resin which is represented by the diglycidyl ether type becomes a stabilizer of the preservation viscosity, in the B-agent system. This epoxy resin is not a necessary compounding agent especially in the B-agent system, but a long-term preservation stability is established by compounding this epoxy resin.

An age resistor which is similar to the above-mentioned epoxy resin is compounded in order to establish a long-term preservation stability. The age resistor have various types including amine derivative, diamine derivative, reactive product of amine, phenol derivative, thiourea group, imidazole group and the like, but a substance which is especially satisfactory is a phenol derivative in the B-agent system. The phenol derivatives are 2,6-ditertiary butyl paracresol, 2,2-methylene bis 4-methyl 6-tertiary butyl hydroquinone, styrenated phenol, 4,4-butyridene bis 6-tertiary butyl metacresol and the like, and these chemical compounds indicate an excellent effectiveness in all cases.

EXAMPLES

Example No. 1

| Compatibility and preservation stability | | | | | | | | |
|---|---|---|---|---|---|---|---|---|
| B-agent compounding | | Compounding No. | | | | | | |
| | | 1 | 2 | 3 | 4 | 5 | 6 | 7 |
| synthetic rubber of chloroprene group | | 18 | | | | | | |
| synthetic rubber of nitrile group | | | 18 | | | | | |
| synthetic rubber of SBR GROUP | | | | 18 | | | | |
| copolymerization resin of vinylchloride-vinylacetate | | | | | 35 | | | |
| epichlorohydrin rubber (homopolymer) | | | | | | 10 | | |
| epichlorohydrin rubber (ethyleneoxide copolymer) | | | | | | | 10 | |
| graft polymer composed of epichlorohydrin rubber and acrylic monomer | | | | | | | | 10 |
| methyl methacrylate | | 82 | 82 | 82 | 65 | 90 | 90 | 90 |
| butylaldehyde-aniline condensation product | | 10 | 10 | 10 | 10 | 10 | 10 | 10 |
| Compatibility of chlorosulfonated polyethylene and acrylic polymer in the A-agent | | a | b | a | b | a | b | c |
| preservation stability | room temp. | 6 months | d | d | d | e | b | b | b |
| | | 12 months | d | d | d | d | e | e | b |

-continued

Compatibility and preservation stability

| B-agent compounding | Compounding No. | | | | | | |
|---|---|---|---|---|---|---|---|
| | 1 | 2 | 3 | 4 | 5 | 6 | 7 |
| 24 months | d | d | d | d | d | d | b |
| 40° C. × 30 days | d | d | d | e | e | e | b |
| 80° C. × 24 hours | d | d | d | d | d | d | e |
| layer separation stability | a | a | a | b | b | a | b |

Example No. 2

Compatibility and preservation stability

| B-agent compounding | Compounding No. | | | | | | |
|---|---|---|---|---|---|---|---|
| | 8 | 9 | 10 | 11 | 12 | 13 | 14 |
| synthetic rubber of chloroprene group | 18 | | | | | | |
| synthetic rubber of nitrile group | | 18 | | | | | |
| synthetic rubber of SBR group | | | 18 | | | | |
| copolymerization resin of vinylchloride-vinylacetate | | | | 35 | | | |
| epichlorohydrin rubber (homopolymer) | | | | | 10 | | |
| epichlorohydrin rubber (ethyleneperoxide copolymer) | | | | | | 10 | |
| graftpolymer composed of epichlorohydrin rubber and acrylic monomer | | | | | | | 10 |
| tetrahydrofurfuryl methacrylate | 82 | 82 | 82 | 65 | 90 | 90 | 90 |
| butylaldehyde-aniline condensation product | 10 | 10 | 10 | 10 | 10 | 10 | 10 |
| compatibility of chlorosulfonated polyethylene and acrylic polymer in the A-agent | a | b | a | b | a | b | c |
| preservation time room temp. 6 months | d | d | d | e | e | e | b |
| 12 months | d | d | d | d | e | d | b |
| 24 months | d | d | d | e | d | d | b |
| 40° C. × 30 days | d | d | d | e | e | d | b |
| 80° C. × 24 hours | d | d | d | d | d | d | e |
| layer separation stability | a | a | a | b | b | a | b | a = inferior,
b = satisfactory,
c = superior,
d = gel,
e = increase in viscosity Example No. 3

Performance test

| B-agent compounding | compounding No. | | | | | | | | | |
|---|---|---|---|---|---|---|---|---|---|---|
| | 15 | 16 | 17 | 18 | 19 | 20 | 21 | 22 | 23 | 24 |
| epichlorohydrin rubber (homopolymer) | 10 | | | 10 | | | 10 | | | |
| epichlorohydrin rubber (ethyleneoxide copolymer) | | 10 | | | 10 | | | 10 | | |
| graft polymer composed of epichlorohydrin rubber and acrylic monomer | | | 10 | | | 10 | | | 10 | 10 |
| butylaldehyde-aniline condensation product | 10 | 10 | 10 | 10 | 10 | 10 | 10 | 10 | 10 | 10 |
| methyl methacrylate | 88 | 88 | 88 | | | | | | | |
| tetrahydrofurfuryl methacrylate | | | | 88 | 88 | 88 | 86 | 86 | 86 | 88 |
| methacrylic acid | | | | | | | 2 | 2 | 2 | |
| epoxy resin | 2 | 2 | 2 | 2 | 2 | 2 | 2 | 2 | 2 | 2 |
| phenol derivative | 0.2 | 0.2 | 0.2 | 0.2 | 0.2 | 0.2 | 0.2 | 0.2 | 0.2 | |
| shear strength in ordinary state Kgf/cm² after 10 minutes | 180 | 180 | 180 | 100 | 100 | 100 | 120 | 120 | 120 | 100 |
| after 24 hours | 300 | 320 | 300 | 200 | 210 | 200 | 220 | 230 | 220 | 200 |
| aging shear strength (Kgf/cm²) | 300 | 320 | 300 | 200 | 210 | 200 | 220 | 230 | 220 | 200 |
| heat-resisting shear strength (Kgf/cm²) | 60 | 60 | 60 | 20 | 20 | 20 | 30 | 30 | 30 | 20 |
| water-resisting shear strength (Kgf/cm²) | 250 | 270 | 250 | 180 | 180 | 180 | 190 | 190 | 190 | 180 |

| The A-agent compounding which is used in the test | |
|---|---|
| chlorosulfonated polyethylene | 35 |
| methyl methacrylate or (tetrahydrofurfuryl methacrylate) | 55 |
| methacrylic acid | 10 |
| ethylene dimethacrylate | 1 |
| epoxy resin | 4 |
| cumene hydroxide | 1 |

| | |
|---|---|
| aging resister | 0.5 |

(Notes)
adhesive test pieces: steel plate mutual: overlapping test of 1 cm × 1 cm
aging test: enforcement of heat treatment (70° C. × seven days) with respect to the test piece after 96 hours in the room temperature, measurement after cooling and standing in the room temperature
heat-resisting test: measurement of intensity under the temperature of 130° C. with respect to the test piece after standing for 48 hours in the room temp.
water resisting test: enforcement of immersion for 7 days in the water of 20 C. with respect to the test piece after standing for 48 hours in the room temperature, measurement of intensity under wet state.

How to Make the Test Pieces

The A-agent and the B-agent are applied severally to both faces of the material to be attached and an adhesion is performed in order to rub and combine slightly immediately, and the curing is carried out by fixing slightly with the jig.

Effect of the Invention

The defects which are possessed by the customary technique are improved by the present invention as follows:

(1) The working property become satisfactory.

A-agent and B-agent have the same viscosity, so the treatment becomes easier.

Also, the mixing application by the applicator becomes practicable.

(2) An excessive permeation of the amine-aldehyde condensation product disappeared.

The amine-aldehyde condensation product is compounded in the B-agent by the graft polymer composed of epichlorohydrin rubber and acrylic monomer as the binder so the excessive permeation of the amine-aldehyde condensation product is prevented.

(3) A stickiness of the overflowing portion is dissolved.

A fact that the amine-aldehyde condensation product is applied excessively disappears and then the stickiness of the overflowing portion is lost.

(4) A filling up-adhesive property is improved.

A inferior contact of the amine-aldehyde condensation product is decreased due to the both main agent types, and the composition in the present invention are capable of being applied to the surfaces with clearances of some degree.

We claim:

1. Two liquids non-mixed type-acrylic adhesive composition for attaching a first and second surface together, comprising:

an A-agent having essentially:

| | |
|---|---|
| a) chlorosulfonated polyethylene | 5-30 parts by weight |
| b) one or more acrylic monomers which are selected from the group consisting of acrylic acid, methacrylic acid, acrylic ester, methacrylic ester, diacrylate, dimethacrylate, polyfunctional acrylate and polyfunctional dimethacrylate | 10-100 parts by weight |
| c) diglycidyl ether epoxy resin | 0-50 parts by weight |
| d) peroxide of cumene hydroxide | 1-50 parts by weight |
| e) age resistor | 0-5 parts by weight; | and a B-agent having essentially:

| | |
|---|---|
| f) a graft polymer consisting essentially of epichlorohydrin rubber and acrylic monomer | 1-40 parts by weight |
| g) polymerization promotor consisting essentially of amine-aldehyde condensation product | 1-50 parts by weight |
| h) one or more acrylic monomers which are selected from the group consisting essentially of acrylic acid, methacrylic acid, acrylic ester, methacrylic ester, diacrylate, dimethacrylate, polyfunctional acrylate and polyfunctional dimethacrylate | 10-100 parts by weight |
| i) diglycidyl ether epoxy resin | 0-50 parts by weight |
| j) age resistor | 0-5 parts by weight, | wherein the A-agent and the B-agent are obtained by mixing and stirring the above-mentioned a–e and f–j, respectively and wherein further the A-agent is applied to the first surface to be attached and the B-agent is applied to the second surface to be attached and subsequently the surfaces to be attached are pressed together, thereby causing the curing of the A-agent by the B-agent to form an adhesive coating.

* * * * *